United States Patent [19]

Karumanchi

[11] Patent Number: 5,509,293
[45] Date of Patent: Apr. 23, 1996

[54] DYNAMIC PAYLOAD MONITOR

[75] Inventor: Arundhati Karumanchi, Metamora, Ill.

[73] Assignee: Caterpillar Inc., Peoria, Ill.

[21] Appl. No.: 359,389

[22] Filed: Dec. 20, 1994

[51] Int. Cl.$^6$ .......................... G01L 25/00; G01G 19/40; G01G 19/08; G01G 19/10
[52] U.S. Cl. ...................... 73/1 B; 177/25.14; 177/139; 177/141
[58] Field of Search ................ 73/1 B; 37/304; 177/25.14, 139, 141, 50

[56] References Cited

U.S. PATENT DOCUMENTS

| | | | |
|---|---|---|---|
| 4,230,196 | 10/1980 | Snead | 177/141 |
| 4,919,222 | 4/1990 | Kyrtsos et al. | 177/141 |
| 5,070,953 | 12/1991 | Kyrtsos et al. | 177/141 |
| 5,105,896 | 4/1992 | Kyrtsos | 177/141 |
| 5,167,287 | 12/1992 | Pomies | 177/141 |

FOREIGN PATENT DOCUMENTS

| | | | |
|---|---|---|---|
| 398809 | 11/1990 | European Pat. Off. | 177/141 |
| 187621 | 11/1982 | Japan | 177/141 |
| 86528 | 3/1992 | Japan | 177/141 |
| 04413 | 6/1988 | WIPO | 177/141 |

*Primary Examiner*—Hezron E. Williams
*Assistant Examiner*—Daniel S. Larkin
*Attorney, Agent, or Firm*—David M. Masterson; James R. Yee

[57] ABSTRACT

A method for dynamically measuring and indicating payload weight for a machine having at least one lift cylinder for elevating a payload carrier is provided. The method includes the steps of lifting a load of known mass during calibrating and sensing a calibration lift cylinder velocity during calibration. To determine payload, lift cylinder hydraulic pressure and lift cylinder extension are sensed during a lifting operation of the machine. A first estimate of the payload is determined as a function of the lift cylinder hydraulic pressure and extension. The method further includes the steps of determining an operating lift cylinder velocity during the lifting operation and determining a velocity correction factor as a function of the calibration lift cylinder velocity and the operating lift cylinder velocity. A second estimate of the payload is calculated as a function of the first estimate and the velocity correction factor.

6 Claims, 6 Drawing Sheets

PRIOR ART Fig_1_
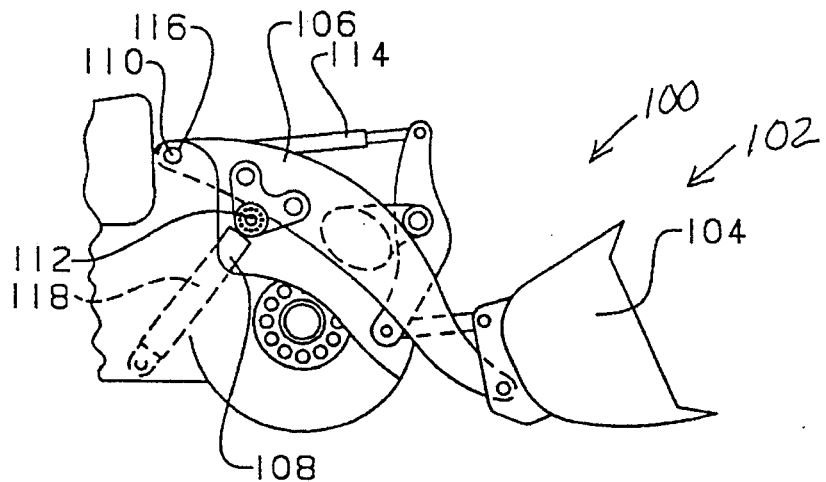
PRIOR ART Fig_2_
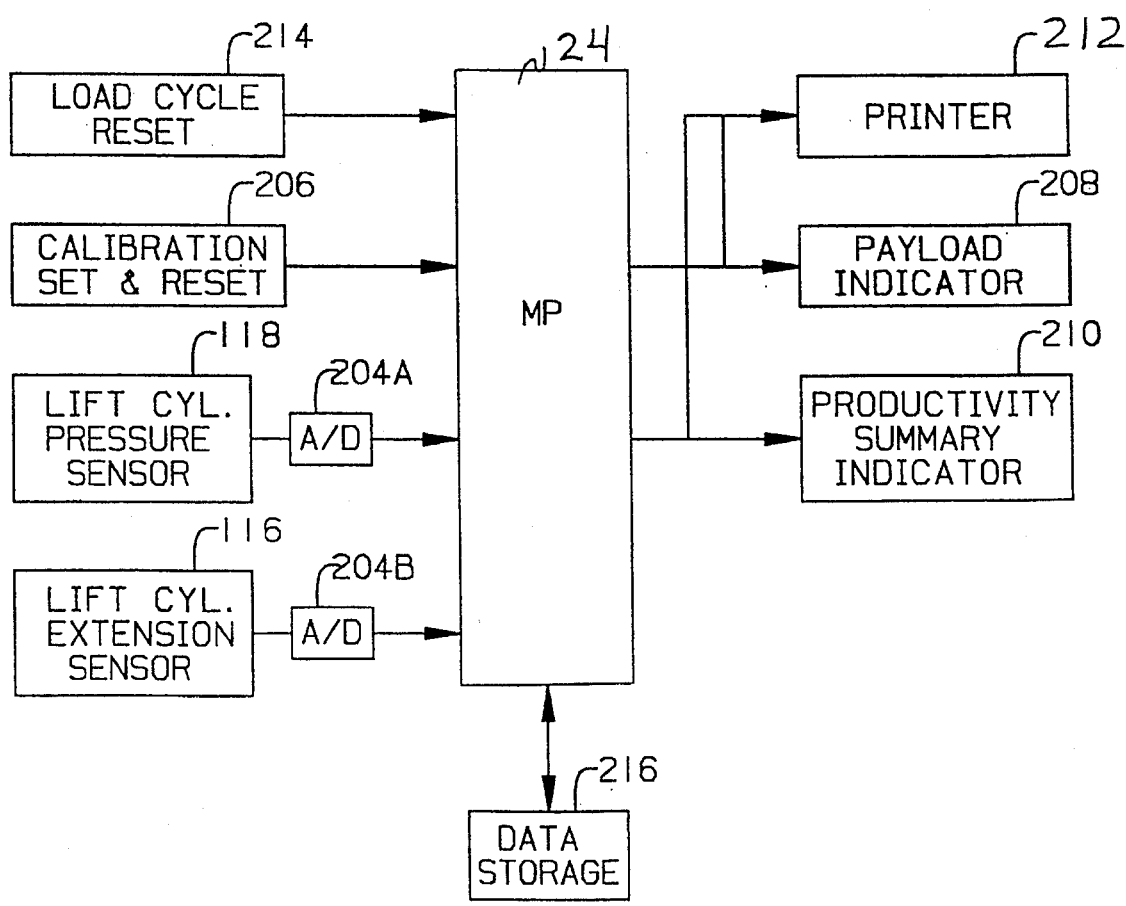

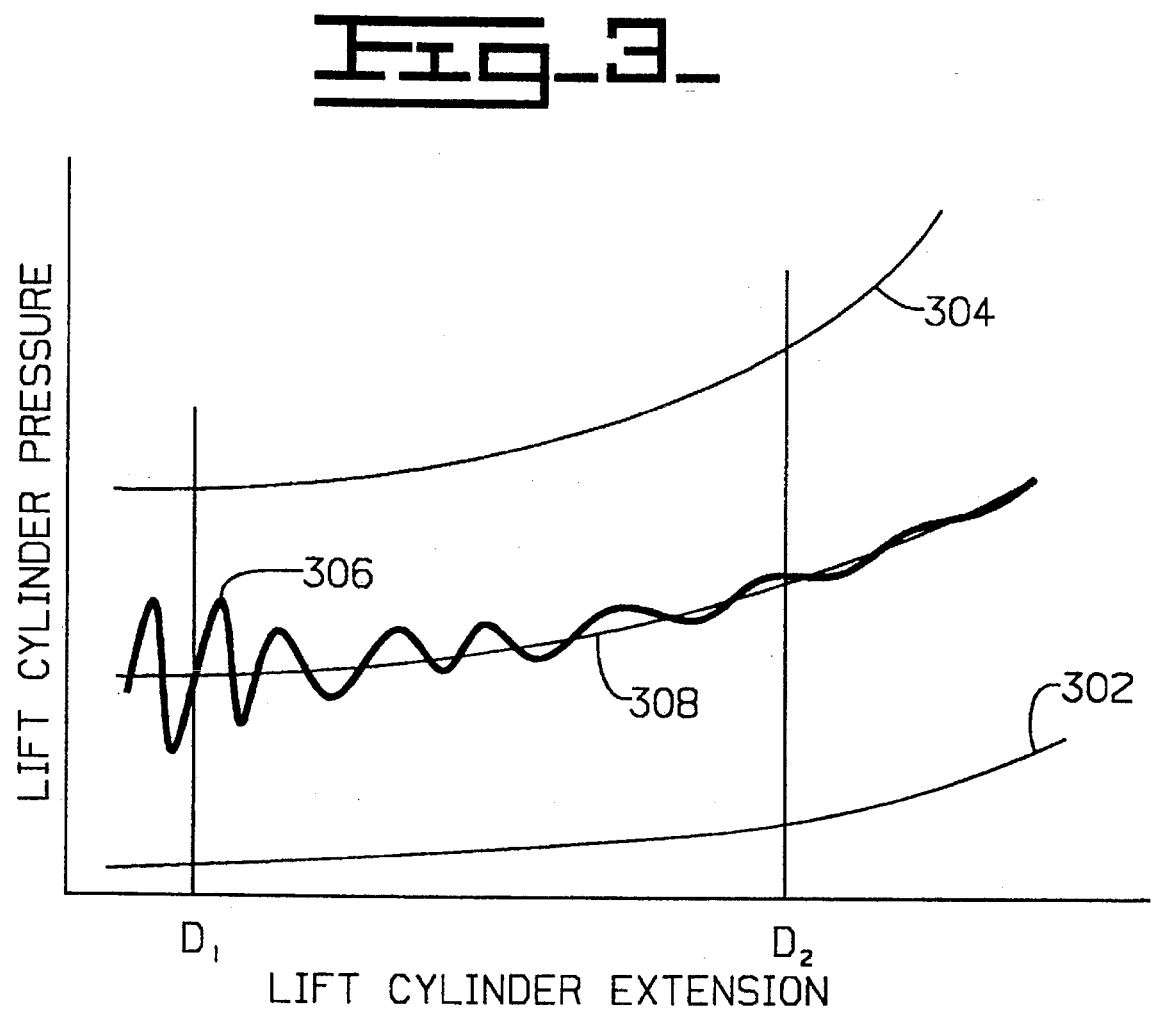
Fig_3_
PRIOR ART

PRIOR ART

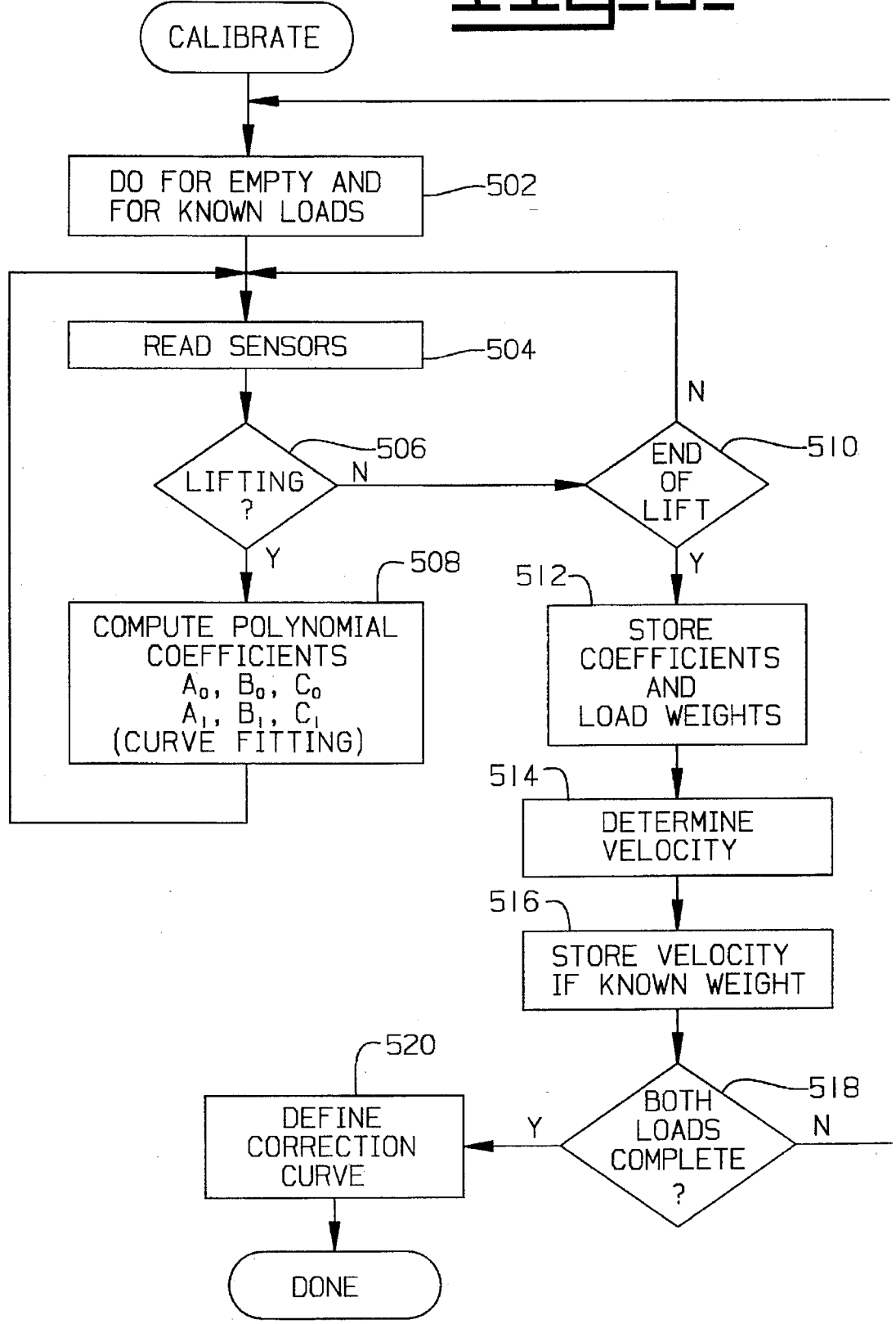
Fig_5_

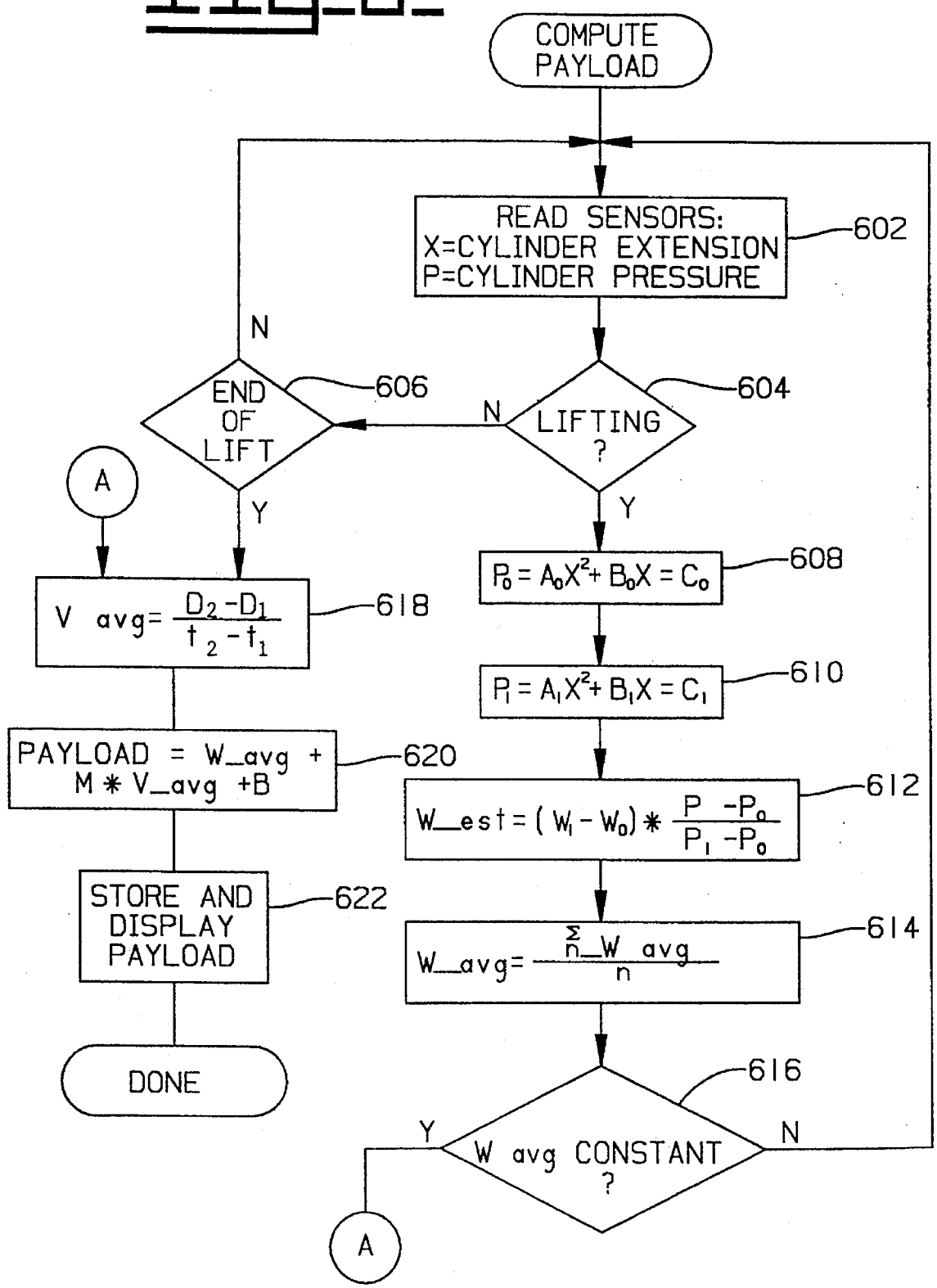

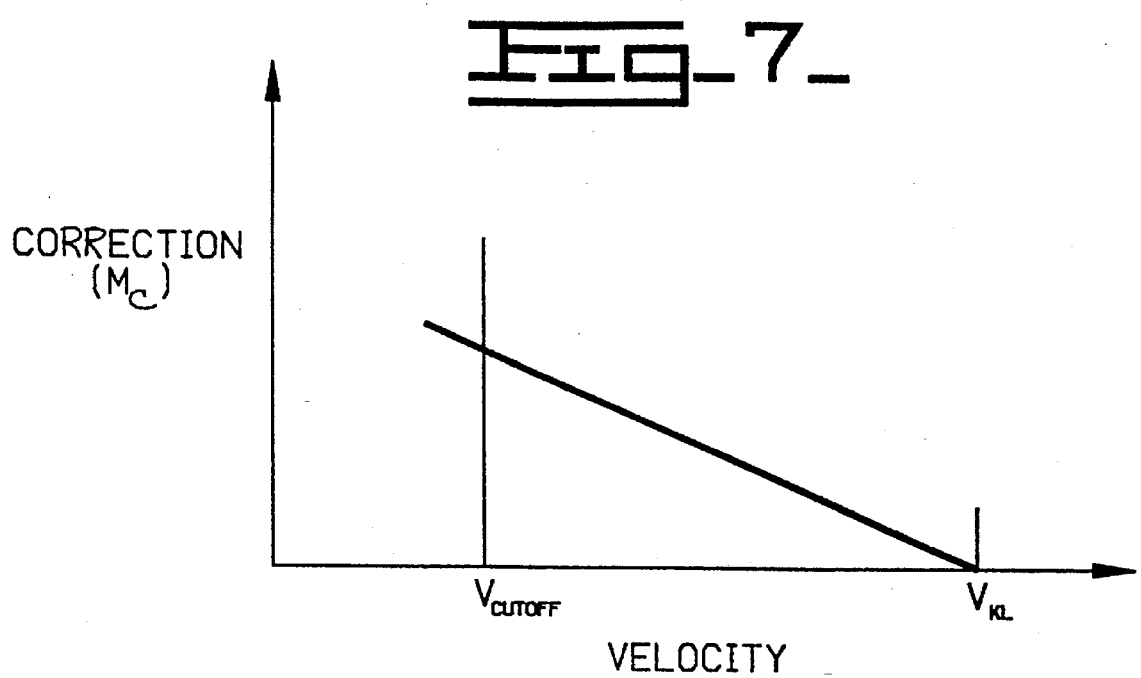

5,509,293

DYNAMIC PAYLOAD MONITOR

TECHNICAL FIELD

This invention relates generally to a method for determining a payload weight of an earth moving machine and more particularly, to a method for adjusting the determined payload weight as a function of lift velocity.

BACKGROUND ART

Hydraulically operated vehicles such as loaders are used generally to transfer bulk material from a stock pile onto a transport vehicle such as trucks or railroad cars. In such vehicle loading applications, it is essential that the transport vehicles are loaded to, but not over, their maximum rated legal capacity. Underloading causes inefficiency in the material hauling cycle and underutilization of the transport vehicles. The penalty for overloading a truck is the additional maintenance cost for the overburden and extra wear on the truck tires and suspension system. Furthermore, the overloaded material may need to be unloaded to decrease load weight, causing additional expense to the hauling operation.

It is easily recognized that payload measurement is also desirable as a measure of the material hauling operation productivity. The ability to accumulate the weight of the material loaded during a single shift, during a twenty-four hour period, or during any increment of time is invaluable to an operations manager.

Recent attempts to provide accurate payload monitors have focused on sensing hydraulic pressure within the lift hydraulic cylinders. The hydraulic pressure through various methods has been used as a direct indication of the payload weight. However, it has become apparent that due to tolerances within the pressure and position transducers, each machine had different results and each had to be individually configured. Also, it become apparent that each sensor tended to drift over time. Thus, each machine had be reconfigured at various points in its life cycle in order to ensure accurate payload measurements.

The present invention is directed at overcoming one or more of the problems as set forth above.

DISCLOSURE OF THE INVENTION

In one aspect of the present invention, a method for dynamically measuring and indicating payload weight for a machine having at least one lift cylinder for elevating a payload carrier is provided. The method includes the steps of lifting a load of known mass during calibrating and sensing a calibration lift cylinder velocity during calibration. To determine payload, lift cylinder hydraulic pressure and lift cylinder extension are sensed during a lifting operation of the machine. A first estimate of the payload is determined as a function of the lift cylinder hydraulic pressure and extension. The method further includes the steps of determining an operating lift cylinder velocity during the lifting operation and determining a velocity correction factor as a function of the calibration lift cylinder velocity and the operating lift cylinder velocity. A second estimate of the payload is calculated as a function of the first estimate and the velocity correction factor.

In another aspect of the present invention, a method for determining a velocity correction factor to be used in determining a payload weight is provided. The machine has at least one lift cylinder for elevating a payload carrier. The method includes the steps of lifting a known mass during a calibration operation, sensing a calibration lift cylinder velocity during the calibration operation, and determining the velocity correction factor as a function of the calibration lift cylinder velocity and operating lift cylinder velocity.

BRIEF DESCRIPTION OF THE DRAWING

FIG. 1 is a side view of the forward portion of a loader vehicle;

FIG. 2 is a functional block diagram of the present invention;

FIG. 3 is a cylinder pressure versus cylinder extension graph;

FIG. 5 is a flow chart of the calibration portion of the algorithm;

FIG. 6 is a flow chart of the computation portion of the algorithm; and

FIG. 7 is a diagram illustrating a correction factor curve according to an embodiment of the present invention.

BEST MODE FOR CARRYING OUT THE INVENTION

Figure 4:
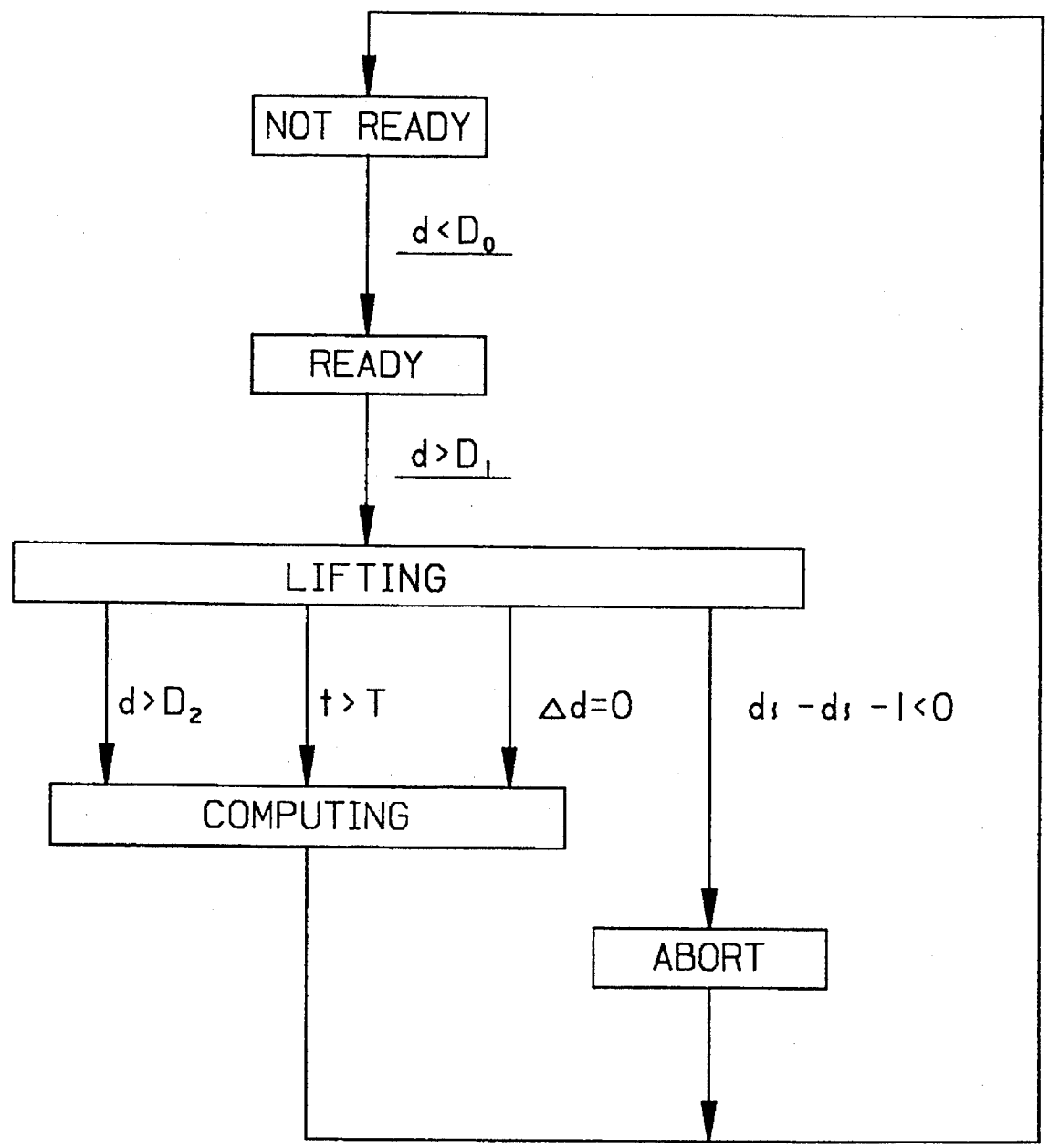
FIG. 4 is a state transition diagram of the system.

With reference to FIG. 1, a payload monitoring system is generally represented by the element number 100. Although FIG. 1 shows a forward portion of a wheel type loader machine 102 having a payload carrier in the form of a bucket 104, the present invention is equally applicable to machines such as track type loaders, and other machines having similar loading implements. The bucket 104 is connected to a lift arm assembly 106 which is pivotally connected to two hydraulic lift cylinders 108 (only one of which is shown) about a pair of lift arm pivot pins 110 (only one shown) attached to the machine frame. A pair of lift arm load bearing pivot pins 112 (only one shown) are attached to the lift arm assembly 106 and the lift cylinders 108. The bucket can also be tilted by a bucket tilt cylinder 114.

The preferred embodiment includes a rotary sensor 116 sensing the rotation of one of the lift arm pivot pins 110 from which the geometry of the lift arm assembly 106 or the extension of the lift cylinders 108 can be derived. The same rotary sensor 116 can be alternatively installed on the load bearing pivot pins 112 to sense the same. A pressure transducer 118 senses the hydraulic pressure in the lift cylinders 108. Although there are two lift cylinders 108, the pressure in the cylinders is generally the same for a given payload and given lift arm assembly geometry. Thus, sensing pressure at one of the cylinders is sufficient for the present application.

Referring to FIG. 2, the cylinder pressure and extension sensor signals are delivered to a microprocessor 24 after being processing by respective analog to digital (A/D) converters 204A,204B. A calibration set & reset control input 206 enables calibration of the payload monitoring system 100. The operator can reset calibration data and enter the calibration payload weight values at the calibration control input 206. A load cycle reset control unit 214 enables the operator to indicate the beginning and end of a load cycle for a specific transporting machine or dump site. The calibration control 206 and the load cycle reset control 214 are preferably implemented in combination with payload weight and productivity summary indicators 208,210 with a liquid crystal display screen (not shown) and an alphanumeric key pad (not shown). The payload weight indicator 208 displays the measured payload weight and any other weight data such as a productivity summary of the loading operation of the loader machine 102. The preferred embodiment includes a printer 212 that produces hard copy reports, and capability to store information in a data storage unit 216 such as nonvolatile memory and a data disk drive.

FIG. 3 graphically illustrates the relationship between cylinder pressure and cylinder extension in an embodiment of the present invention. The pressure and extension data is plotted on a graph having the lift cylinder pressure on the vertical Y-axis and the lift cylinder extension on the horizontal X-axis. A first parabolic curve 302 represents the curve fitted pressure versus extension data for an empty loader bucket 104. A second parabolic curve 304 represents the curve fitted pressure versus extension data for a payload of known weight. This known weight is preferably at or near the rated load capacity of the vehicle. The parabolas can be represented mathematically by second order polynomials. Curves 302,304 are sampled and stored as the reference weight curves for the system during the calibration portion (FIG. 5) of the algorithm.

As shown in FIG. 3, the lift cylinder pressure increases as the cylinder extension increases, so that the measured weight is dependent on the geometry of the lift arm assembly 106 as it is being raised from the ground to dump height. Because the loader is typically digging at the beginning of a work cycle and dumping at the end of the cycle, cylinder pressure varies drastically at the end of the cycle and the dynamic of the system become unstable. Therefore, weight measurement is confined to a time period when the lift cylinder extension displacement is between D1 and D2, where D2>D1. This ensures a set of usable sample data that accurately represents payload weight during a relatively stable portion of the work cycle. Trace 306 represents the measured load cylinder pressure versus cylinder extension. The random surges in the trace 306 denote the pressure variations in the lift cylinder during vehicle travel and directional changes.

Curve 308, which is shown superimposed over trace 306, has been curve fitted and averaged to remove the random pressure surges. The smoothed parabola 308 is an accurate representation of the pressure versus extension of the weight being measured. Experimentation has shown that lift cylinder pressure varies linearly with the weight of the payload at a cylinder extension for a specific lift velocity. Therefore, the weight for the measuring payload can be calculated by interpolation if the curve 308 falls within the reference curves 302,304, and extrapolation if the curve 308 is outside of the reference curves 302,304.

Referring to FIG. 4, a state transition diagram of the present invention is shown. The present embodiment of the payload monitor 100 makes a transition from state NOT READY to READY when the lift cylinder extension is less than a first predetermined set point $D_0$ ($d<D_0$). When the current displacement (d), is less than $D_0$, the payload carrier or bucket 104 is most probably digging or crowding a pile. When the displacement (d), is greater than another predetermined displacement set point $D_1$ ($d>D_1$), the vehicle is lifting the payload carrier 104, and the present state is LIFTING. During LIFTING, cylinder pressure and position data are sampled.

Three conditions can cause state transition from LIFTING to COMPUTING. State transition occurs when cylinder extension exceeds another setpoint $D_2$ ($d>D_2$), signifying that the payload carrier has been raised and is approaching dump height. If, after T seconds, displacement $D_2$ still has not been reached (t>T), the system equally makes the same transition from LIFTING to COMPUTING. The third condition for the transition is when the cylinder displacement, d, remains the same ($\Delta d=0$). This condition denotes most load-and-carry operations where the loader machine 102 performs additionally as the transport machine and travels to the destination with the bucket 104 held at a constant level. The payload weighing algorithm is aborted (ABORT) when the payload carrier is detected to have been lowered ($d_i-d_{i-1}<0$). The values $D_0$, $D_1$, $D_2$, and T are determined according to the specific vehicle, and can be obtained by measurement and experimentation.

Keeping the state transition diagram of FIG. 4 in mind, reference is now made to the calibration flowchart of FIG. 5. Calibration is done with the machine at high idle. Calibration is done sequentially with both an empty and a known load as shown in block 502. The order of which either is performed is unimportant, but cylinder pressure and position data for both weight values must be sampled.

In block 504, the cylinder pressure and position sensors are read. The LIFTING state flag is checked at block 506 and if the payload is being lifted, the polynomial coefficients, $A_0$, $B_0$, $C_0$, $A_1$, $B_1$, $C_1$, for that specific pressure and position sample are computed (block 508). This is the step where the sampled sensor data points are curve fitted to a second order polynomial.

If the payload is not being lifted (LIFTING flag is false), then it is checked to see if END OF LIFT has occurred (control block 510). This flag is true if any of the conditions for state transition from LIFTING to COMPUTING is true in FIG. 4. If the end of lift conditions are not met, the algorithm returns to block 504 to continue to read sensor inputs. Otherwise, in block 512, the coefficients are stored along with the payload weight, which is either zero for an empty bucket or nonzero for a known weight.

In control block 514, the velocity of lift arm extension during lifting of the load is determined from the position sensor data. The lift velocity may be determined by dividing the distance the cylinder has extended by the amount of time it took. If the load being lifted is the known load, then the velocity data is stored in control block 516. Finally, a check is made to make certain that both empty and known payload weights are sampled for completing the calibration algorithm (block 518).

In block 520, a correction curve as a function of the lift arm velocity is defined. In the preferred embodiment, the correction curve is linear as shown in FIG. 7. The correction curve begins at some minimum velocity ($V_{CUTOFF}$) and ends with a correction factor of zero (0) at the known load velocity ($V_{KL}$). In one embodiment, the correction curve is stored as a line in the form of mx+b. In another embodiment, the correction curve is stored as a look-up table. In either embodiment, a correction factor for a particular lifting operation is determined by inputting the current velocity into the linear function or the look-up table and determining the correct correction factor (see below).

Referring to FIG. 6, the payload weight calculation algorithm is discussed. Payload weight is calculated when the state of the system is LIFTING (refer back to FIG. 4). The work cylinder pressure and position sensors 118, 116 are read in block 602. The LIFTING state flag is checked in block 604. If the machine 102 is still lifting the payload carrier 104, the cylinder pressure $P_0$ for the empty payload carrier (zero payload weight) at that cylinder extension X is calculated by using coefficient values computed during calibration (block 608). Similarly in the block 610, the cylinder pressure $P_1$ for the known load at that cylinder extension X is computed. Next in block 612, the estimated payload weight W_est is calculated by using the following interpolate and extrapolate formula:

$$W\_est = (W_1 - W_0) * [(P - P_0)/(P_1 - P_0)]$$

where

W$_1$ is the known payload weight,

W$_0$ is the empty payload weight,

P is the current sampled pressure,

P$_1$ is pressure for the known load, and

P$_0$ is pressure for the empty load.

All the values above are values for the measured extension X. Then an average W_avg is computed for all the estimated weight W_est as shown in block 614.

If in block 616, the average weight has remained virtually constant for a predetermined amount of time, there is no further advantage to prolong the sampling period. If, at block 604, it is detected that the LIFTING state flag is no longer true, then the END OF LIFT is checked in block 606. This flag is true if any of the conditions for state transition from LIFTING to COMPUTING is true in FIG. 4. If the end of lift conditions are not met, the algorithm returns to block 602 to continuously read sensor inputs. Otherwise, the average lift velocity V_avg is computed by dividing the distance the cylinder has extended by the amount of time it took, as shown in block 618. Since it has been shown that the cylinder pressure versus extension curves (or the payload weight derived thereof) have a linear relationship with respect to the lift velocity, i.e. the faster the lift, the higher the payload weight value, adjustments need to be made to compensate for the linear shift. In block 620, the computed payload weight is adjusted by a value according to the computed average velocity:

$M_C * V\_avg + K$, where $M_C$ is determined using the correction curve defined above and K is derived experimentally.

Thereafter in block 622, the computed payload value is stored and displayed. The payload values may also be used in computing productivity summaries, and accumulated for specific transport vehicles and dump sites.

INDUSTRIAL APPLICABILITY

The operation of the present invention is best described in relation to its use in loading applications where knowledge of payload weight is important. This payload measurement system is also invaluable to operations where it is desirable to monitor loader vehicle productivity.

Prior to using the payload monitor 100, the system must be calibrated. Calibration must also be repeated whenever there has been a change in the lift arm assembly configuration, such as switching to a different bucket 104 or a substantial overhaul of any of the lift arm assembly subsystem. Calibration of the payload monitor 100 includes lifting the lift arm assembly 106 from ground level to dump level with an empty bucket, entering the payload weight, and repeating the procedure with material of a known weight in the bucket. Preferably, the known weight is near or at the rated capacity of the loader vehicle. The bucket 104 should be racked back during the lifting process to ensure the center of gravity (C.G.) of the payload weight remains near the center of the bucket 104. The racked back bucket constraint may be removed by including a position sensor in the tilt cylinder to sense the degree of bucket tilt to compensate for the C.G. shift.

A typical work cycle of a loader machine 102 includes, sequentially: digging and/or crowding a stock pile, racking back the bucket 104 to maintain load, reversing and backing out of the pile while raising the bucket 104, traveling to a dump site or a transport vehicle while continuously raising the bucket 104, and finally dumping the load at a raised position. This loading cycle is not interrupted by the usage of the dynamic payload monitor 100, because stopping the machine 102 is not required and the bucket 104 is not required to be positioned at a specific height for a period of time. The operator simply resets the load cycle, enters the assigned dump vehicle or site number if such function is desired, and proceeds to load and dump following a normal work cycle. In addition, productivity summaries and hard copies of such and other payload information may be obtained from the system. The payload data may also be downloaded to a data disk for storage or for analysis in an office setting.

The present invention is also expandable to other vehicles with different linkage configuration by compensating for the difference thereof. Anticipated applicable machine types are excavators, front shovels, backhoe loaders, and any machines having at least one linkage with at least one hydraulic cylinder for effecting that linkage. For these machine linkage configurations, additional pressure and position sensors are needed to detect cylinder pressure and the exact linkage geometry during the work cycle. However, the basic payload weight calculation remains the same by using curve fitting methods and two reference weight parabolic equations.

Other aspects, objects, and advantages of this invention can be obtained from a study of the drawings, the disclosure, and the appended claims.

I claim:

1. A method for dynamically measuring and indicating payload weight for a machine having at least one lift cylinder for elevating a payload carrier, including the steps of:

lifting a load of known mass during a calibration operation;

sensing a calibration lift cylinder velocity during said calibration operation;

lifting a load of an unknown mass during a lifting operation;

sensing a lift cylinder hydraulic pressure during said lifting operation;

sensing a lift cylinder extension during said lifting operation;

determining a first estimate of the payload as a function of said lift cylinder hydraulic pressure and extension;

determining an operating lift cylinder velocity during said lifting operation;

determining a velocity correction factor as a function of said calibration lift cylinder velocity and operating lift cylinder velocity;

calculating a second estimate of the payload as a function of said first estimate and said velocity correction factor.

2. A method, as set forth in claim 1, including the step of defining a velocity correction factor curve having an endpoint at said calibration lift cylinder velocity.

3. A method, as set forth in claim 2, wherein said velocity correction factor curve is linear.

4. A method for determining a velocity correction factor to be used in determining a payload weight for a machine having at least one lift cylinder for elevating a payload carrier, including the steps of:

lifting a known mass during a calibration operation;

sensing a calibration lift cylinder velocity during said calibration operation; and determining the velocity correction factor as a function of said calibration lift cylinder velocity and operating lift cylinder velocity.

5. A method, as set forth in claim 4, including the step of defining a velocity correction factor curve having an endpoint at said calibration lift cylinder velocity.

6. A method, as set forth in claim 5, wherein said velocity correction factor curve is linear.

* * * * *